(12) United States Patent
Guilbert et al.

(10) Patent No.: US 7,387,756 B2
(45) Date of Patent: Jun. 17, 2008

(54) METHOD FOR PREPARING COMPOSITE MATERIALS CONTAINING NATURAL BINDERS

(75) Inventors: Stephane Guilbert, Montpellier (FR); Andreas Redl, Zevergem/de Pinte (BE); Marie-Helene Morel, Montpellier (FR)

(73) Assignees: Tate & Lyle Europe, Aalst (BE); ENSAM, Montpellier (FR)

( * ) Notice: Subject to any disclaimer, the term of this patent is extended or adjusted under 35 U.S.C. 154(b) by 499 days.

(21) Appl. No.: 10/466,915

(22) PCT Filed: Jan. 21, 2002

(86) PCT No.: PCT/EP02/00662

§ 371 (c)(1),
(2), (4) Date: Nov. 10, 2003

(87) PCT Pub. No.: WO02/059212

PCT Pub. Date: Aug. 1, 2002

(65) Prior Publication Data

US 2004/0062920 A1    Apr. 1, 2004

(30) Foreign Application Priority Data

Jan. 23, 2001 (GB) ................. 0101630.2

(51) Int. Cl.
*B27N 3/08* (2006.01)

(52) U.S. Cl. .................... 264/122; 264/109

(58) Field of Classification Search .......... 264/109–128
See application file for complete search history.

(56) References Cited

U.S. PATENT DOCUMENTS

| 1,427,378 | A |   | 8/1922  | Gruber et al. |
| 2,543,925 | A |   | 3/1951  | Monath |
| 5,360,586 | A |   | 11/1994 | Wyatt et al. |
| 5,582,682 | A | * | 12/1996 | Ferretti ........................ 162/10 |
| 5,916,503 | A | * | 6/1999  | Rettenbacher ............. 264/45.3 |
| 6,284,838 | B1 |  | 9/2001  | Silbiger |
| 6,719,882 | B2 | * | 4/2004 | Vijayendran et al. ..... 162/164.6 |
| 2005/0070635 | A1 | * | 3/2005 | Breyer et al. .................. 524/13 |

FOREIGN PATENT DOCUMENTS

| CN | 1085487     | 4/1994 |
| DE | 19843493    | 3/2000 |
| EP | 0556577     | 8/1993 |
| EP | 0987089     | 3/2000 |
| JP | 10 113913   | 5/1998 |
| WO | WO 96/14970 | 5/1996 |
| WO | WO 98/06785 | 2/1998 |

\* cited by examiner

*Primary Examiner*—Mary Lynn Theisen
(74) *Attorney, Agent, or Firm*—James Creighton Wray; Clifford D. Hyra

(57) ABSTRACT

The invention relates to a method for preparing natural fibre-based composite materials containing natural binders and powdery proteins, comprising the following steps; adding a powdery protein adhesive binder to natural fibres having a moisture content of 1 15%; mixing the natural fibres together with the powdery protein adhesive; adjusting the moisture content of the composition to 6 24% w/w; and submitting the mixture to a heat pressure treatment to form the natural fibre-based material.

17 Claims, 1 Drawing Sheet

METHOD FOR PREPARING COMPOSITE MATERIALS CONTAINING NATURAL BINDERS

This application claims the benefit of Great Britain Application No. 0101630.2 filed Jan. 23, 2001 and PCT/EP02/00665 filed Jan. 21, 2002.

BACKGROUND OF THE INVENTION

The invention relates to a method for preparing natural fibre-based composite materials containing natural binders and powdery proteins.

With this methods, products are made in the form of artefacts such as panels and boards, composed of wood and/or non-wood natural fibre materials and a protein as the sole binder component (added).

Today, manufacture of the panels and boards is generally performed by means of hot pressing of wood or other vegetable fibres in presence of a reactive resin. Typical resins used during the mixing process are urea formaldehyde (UF) resins, phenol formaldehyde (PF) resins and melamine urea formaldehyde (MUF) resins. During the initial blending process aqueous resin is sprayed on the dry wood or vegetable fibres (2-4% moisture) and the whole is blended. The fibres dosed with resin can then be submitted to a further drying step. During this drying process the resin-dosed fibre is pneumatically or mechanically conveyed to the intermediate storage bins. From here, the fibre is transported to the mat forming line and to the pre-press. The thus formed mats are then entering the press and stacked. These mats are then submitted to hot pressing to consolidate the mat to a desirable panel density and thickness, to cure the resins and to heat stabilise the panel so that it will remain at the target thickness and density under normal service conditions. Also continuous presses can be used. The thus obtained panels are then finished by shaving-off the edges by sanding the surfaces.

A disadvantage of this process is that the fibre material must be dried to a sufficient level to allow the blending with the liquid resin; otherwise homogeneous blending is not possible while lump formation occurs at too high moisture content.

An other disadvantage is that when adding the resin, the temperature during the blending and forming step must be controlled, because otherwise, a premature reaction occurs, and this is not desirable.

To reduce or avoid the use of the resin adhesives, the resin adhesives can be partially or fully replaced by renewable resources. The use of animal or vegetable proteins in fibreboard is disclosed in Forest Products Journal (1998, vol.47, n° 2, p. 71-75), wherein the use of soya protein isolates in combination with synthetic resins is discussed. Also the use of soya isolate powder is disclosed. In this method, wood particles are sprayed with 4% phenol formaldehyde resin, whereafter the mixture is further tumbled in a blender while 4% soya isolate powder is slowly added. Also the use of a soya isolate dispersion as the sole adhesive is disclosed.

However, the resultant fibreboard has the disadvantage that it has no moisture resistance.

The use of animal proteins in powder form is further disclosed in Sovjet patent application SU 1 813 640. In the disclosed method, lime milk (1,6-3,2%) and water (35-45%) are added to a fibre material at about 4% moisture content. In a next step, 8-16% albumin or casein powder glue is added, and the whole is mixed until the glue is uniformly distributed into the fibre material. The composition is then heated between 140-170° C. at a pressure of 1,4-2,5 Mpa, this during 0,6-1,0 min/mm.

The use of wheat gluten as an adhesive has been disclosed in Starch (1968, vol2O, no 12 p. 395-399). The gluten that is used is reduced with sodium sulphite or thioglycolic acid.

The disadvantage related to these products is that the wheat gluten adhesive is obtained through a chemical reaction in an aqueous medium.

In Dutch patent application NL 1 003 133, the use of an adhesive based on wheat gluten for preparing fibreboard is disclosed. The wheat gluten glue used is a dispersion at 55-60% d.s., obtained by dispersing gluten into a solution of urea, citric acid and sodium bisulpite. The gluten glue, which is first mixed with a cross-linker (formaldehyde, glutardialdehyde or maleic anhydride), is then sprayed on and mechanically mixed with the wood fibre substrate.

The disadvantage here is that dispersing aids are needed to prepare the gluten glue dispersion.

Also the use of proteins as formaldehyde scavenger is disclosed in Dutch patent application NL 1 003 133, whereby 10% of a standard urea formaldehyde resin is replaced by gluten glue.

The disadvantage is that above 10% replacement of the standard urea formaldehyde resin, there is a clear loss of Internal Bond Strength.

In the European patent application EP 976 790, a process for the manufacture of composite materials is disclosed, in which a vegetable material containing fibre, or a mixture of such vegetable materials, are subjected to at least one thermoplastic processing step. The thermoplastic processing may be carried out in the presence of a bonding agent, for example a chemical bonding agent such as urea-formaldehyde, or a protein (which protein may be contained in the vegetable material or added to it). Prior to the thermoplastic processing step(s), the vegetable material(s) are subjected to at least one preliminary treatment. The product of the thermoplastic processing step(s) may be subjected to an after-treatment. The vegetable material(s) may be mixed with additives prior to and/or during the thermoplastic processing step(s). The composites may be formed in a variety of configurations, including board, sheets and films, and may find use as constructional items.

The disadvantage is that when proteins are used as the sole binder, relative to the total of the fibrous vegetable material and protein, the amount of water may be in the range of 25 to 50% by weight. As a result thereof, the compression-moulded articles must be submitted to an additional time and energy consuming drying step.

SUMMARY OF THE INVENTION

The purpose of the invention is to resolve the abovementioned disadvantages. This purpose is achieved by providing a method for preparing natural fibre-based composite materials containing natural binders and powdery proteins, comprising the following steps:

adding a powdery protein adhesive binder to natural fibres having a moisture content of 1-15%;

mixing the natural fibres together with the powdery protein adhesive;

adjusting the moisture content of the composition to 6-24% w/w; and submitting the mixture to a heat pressure treatment to form the natural fibre-based material.

In a preferred method according the invention, the ratio of natural fibres and protein powder adhesive varies between 19:1 up to 1:1.

In a preferred method according the invention, the heat pressure treatment is performed within a temperature range of 100-250° C.

In a preferred method according to the invention, the proteins added to the fibres have a moisture content varying between 4 and 14% w/w.

In a more preferred method according the invention, the proteins added to the natural fibres have a moisture content between 8 and 12% w/w.

In a specific method according to the invention, the wood or plant fibres have a moisture content between 1 and 20% w/w.

In a more specific method according to the invention, the wood or plant fibres have a moisture content between 2 and 15% w/w.

Preferably, the natural fibre-based composite materials include one of the products selected from packaging materials, decorative items, backing materials or structural materials.

In a preferred method according to the invention, said natural fibres can be obtained from whole plants or various parts thereof.

In a preferred method according to the invention, said natural fibres can be of animal origin.

In a preferred method according to the invention, said powdery protein adhesive can be of animal origin.

In another preferred method according to the invention, said powdery protein adhesive can be of vegetable origin.

In a preferred method according to the invention, the final moisture content of the composition is adjusted to 12-20% w/w.

In a more preferred method according to the invention, the final moisture content of the composition is adjusted to 14-18% w/w.

In a preferred method according to the invention, the ratio of natural fibres and protein powder adhesive vary between 9:1 and 2:1.

In a more preferred method according the invention, the ratio of natural fibres and protein powder adhesive vary between 9:1 and 2,5:1.

In a preferred method according to the invention, the heat pressure treatment is performed within a temperature range of 175-225° C.

In a specific method according to the invention, the heat pressure treatment is performed by means of compression moulding or by hot pressing in open presses.

In a specific method according to the invention, during hot pressing treatment a pressure is exercised that is sufficient to obtain a natural fibre-based composite material with a density varying between 0,5 kg/dm$^3$ and 1,5 kg/dm$^3$.

DETAILED DESCRIPTION OF THE INVENTION

Figure 1:
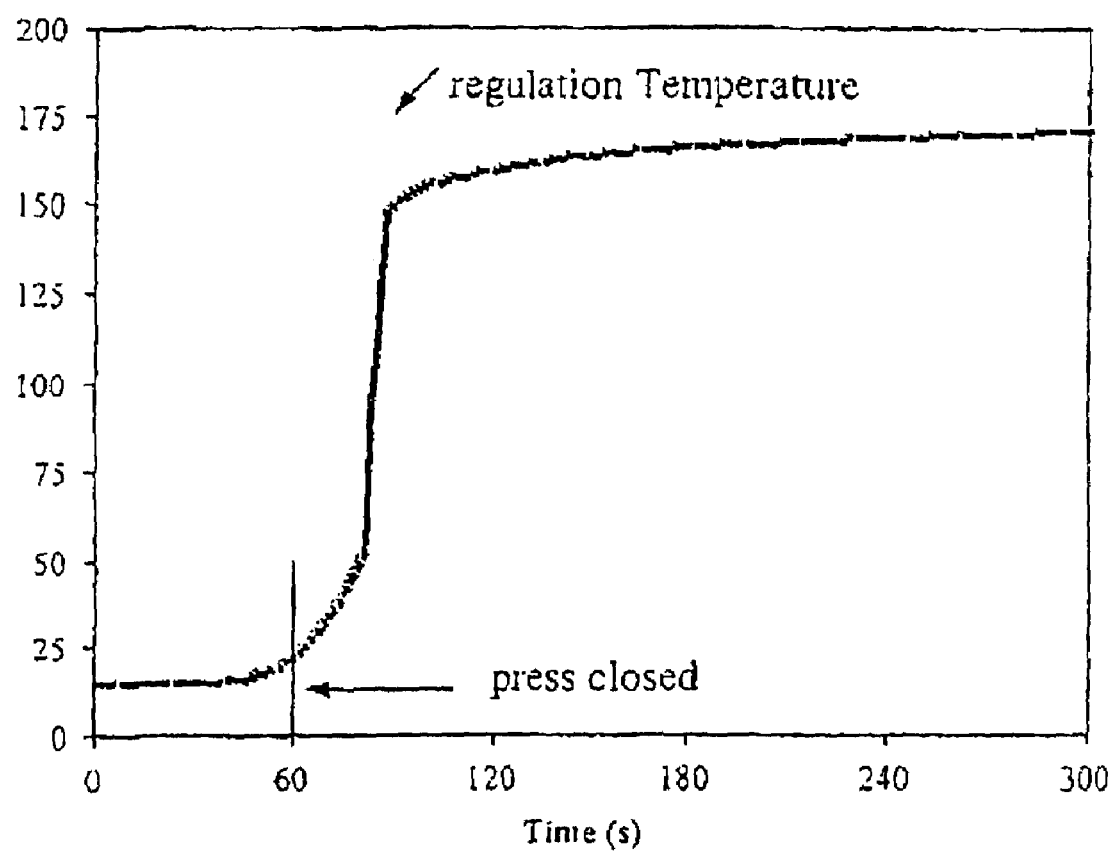
FIG. 1 is a graph showing the core temperature evolution during pressing of gluten and wood particles with 175° C. regulation temperature, 300 g wood (9% MC), and 60 g gluten (7% MC).

In general, the term natural fibre-based composite materials concerns reconstituted products containing natural fibres originating from wood and/or annual plants, and an adhesive. Such composite materials include e.g. packaging materials, decorative items, backing materials, structural materials. More particularly, it refers to construction or building materials such as e.g. particleboard, medium density and high-density fibreboard, oriented strand board or chipboard. Other compositions comprise e.g. packaging materials (bottles, containers), decorative items (door panels), backing materials (carpet tiles, roofing materials), or structural materials (e.g. car bumpers).

Apart from wood, natural fibre materials can be obtained from whole plants or from various parts thereof. Textile fibres such as cotton, flax hemp or ramie can be used, but also meal products from the cereals or oilseed processing industry. Typical examples thereof are wheat bran, corn bran, wheat straw, barley husks, rapemeal, sunflower meal, soybean meal, etc. The natural fibre materials can also be of animal origin such as wool, silk or keratin-waste, etc.

The powdery protein adhesive can be of animal or vegetable origin. Animal protein sources are e.g. milk proteins, caseinates, whey concentrates and isolates, gelatine, fish proteins, egg albumin, plasma proteins, animal flours, etc. The vegetable proteins can be selected among e.g. cereal proteins, tuberous proteins, proteins from leguminous origin, or oilseed proteins. Typical cereal proteins that can be used are wheat gluten, or maize gluten and derivatives thereof. Among the oilseed proteins, soy protein concentrates and isolates, rapeseed protein concentrates or sunflower protein concentrates, or derivatives thereof can be used, also. This list must not be considered as limiting, but merely as an illustration of the protein sources that can be used.

The proteins added to the natural fibres have a moisture content varying between 4 and 14% w/w, preferably varying between 8 and 12% w/w. The wood or plant fibres may have a moisture content between 1 and 20% w/w, 2 to 15% w/w being preferred. In contrast with standard conditions used during e.g. panel manufacture, the moisture content of the fibres can be higher because no additional moisture is added via the binding agent. This can offer an additional advantage with regard to drying cost reduction of the wood or plant fibres.

The natural fibres together with the powdery adhesive are mixed, and the final moisture content of the fibre/protein composition, before the heat pressure treatment, may vary between 6 and 24% w/w. Preferred ranges of moisture content are between 12 and 20% w/w, more preferably between 14 and 18% w/w. It is believed that his moisture content activates an initial sticking process, in which there occurs an interaction between the proteins and the fibres. In this way, there is already a stabilisation before the heat pressure treatment. When the moisture content of the protein/fibre composition is too low, the phases can separate. When the moisture content of the fibre/protein composition is too high, more heat is needed to remove the water, and the final product has a less mechanical strength. With a moisture content between 6 and 24% w/w, the fibre/protein composition is already sufficiently homogeneous, which avoids an extra kneading step.

The ratio of natural fibre material and protein powder adhesive may vary between 19:1 up to 1:1, preferably between 9:1 and 2:1 and more preferably between 9:1 and 2,5:1.

Heat pressure treatment of the fibre/adhesive composition is performed within a temperature range of 100-250° C., preferably between 175° C. and 225° C. Pressure exercised during hot pressing must be sufficient to obtain densities varying between 0,5 kg/dm$^3$ and 1,5 kg/dm$^3$.

The heat pressure treatment of the compositions may be performed by means of compression moulding or by hot pressing of the fibre/protein composition. The processing parameters, in particular temperature, pressure, and processing time will depend in any given case upon the nature of the starting materials and desired properties of the end products. It is observed that temperature evolution in the core of the product during hot pressing or compression moulding is quite fast, as illustrated by FIG. 1 (see example 4).

The panel products obtained by means of the processes according to the invention do show excellent mechanical properties and sufficiently low water sensitivity.

It can be considered as an additional advantage that the prepared composites according to the invention are composed of biodegradable compounds. This can be of importance where materials are difficult to recycle.

The invention will now be further illustrated by way of specific examples, which are purely illustrative and not intended to limit the scope of the invention.

EXAMPLE 1

In this example the influence of the gluten fraction (GF), moisture content (MC) and pressing temperature (T), on the density (D) and the thickness swelling (TS) of panel boards, containing hemp fibres, is illustrated. Especially the thickness swelling (water sensitivity) is a measure for the quality of adhesion between fibres and matrix.

Materials Used:
- vital wheat gluten, moisture content 8,6% (Amylum Aquitaine, Bordeaux, France)
- Hemp fibres, moisture content 8,9%, mean size 3 mm (Agricultural cooperative "La Chanvriere de l'Aube")

The hemp fibres are mixed with wheat gluten in a tumbling mixer (Heidolph Rheax 2, Germany) for 10 minutes. The volume of the mixing bowls is 100 ml, the total mass is 10 g, the fibre weight fraction is 0.6, 0.7, 0.8, 0.9 w/w. Water is sprayed in the mixing bowl in order to raise the final water content to 18%, the water content of the mixture without water addition being 9%.

The fibre/gluten mix is poured into a cylindrical mould (diameter 35 mm) and pressed for 10 minutes at 100, 125, 150, 175, and 200° C. under 10T load.

The samples thus obtained are immersed in distilled water (at 25° C.) for 24 h. The thickness swelling is then determined as the percentage increase of the sample thickness as measured at the centre of the disks with a digital calliper square.

The material density is determined after measuring the sample thickness and diameter with a digital calliper square to the nearest 0,01 mm and weighting the sample on a precision balance.

The moisture content of raw materials and samples is determined by weight difference after 24 h drying at 104° C.

The results are given in table 1.

TABLE 1

Gluten/hemp fibre compositions: influence moisture content (MC) and pressing temperature (T) on density (D) and thickness swelling (TS)

| Gluten fraction (w/w) | MC (% dm) | T (° C.) | D (T/m$^3$) | TS (%, 24 h) |
|---|---|---|---|---|
| 0.3 | 8.65 | 125 | 1.43 | 114.25 |
| 0.3 | 8.65 | 150 | 1.44 | 41.21 |
| 0.3 | 8.65 | 175 | 1.32 | 31.25 |
| 0.3 | 16.9 | 125 | 1.41 | 28.21 |
| 0.3 | 16.9 | 150 | 1.33 | 18.73 |
| 0.3 | 16.9 | 175 | 1.23 | 18.38 |
| 0.3 | 16.9 | 200 | 1.12 | 19.55 |
| 0.4 | 17 | 175 | 1.06 | 40.06 |
| 0.2 | 17 | 175 | 1.17 | 54.08 |
| 0.1 | 17 | 175 | 1.28 | 78.09 |

EXAMPLE 2

In this example different types of natural fibres are used. The method of preparing them is analogous to the process described in example 1. Also here, density and thickness swelling are determined in function of pressing temperature and moisture content. The following materials are used: wheat straw, wheat bran, and quebracho wood flour.

The gluten fraction is always 0,3. In table 2, the results of thickness swelling and density are given.

TABLE 2

Comparison of different fibres: influence moisture content (MC) and pressing temperature (T) on density (D) and thickness swelling (TS)

| Fibre type | MC (% dm) | T (° C.) | D (T/m$^3$) | TS (%, 24 h) |
|---|---|---|---|---|
| Wheat straw | 8.15 | 150 | 1.23 | 133.53 |
| Wheat straw | 8.15 | 175 | 0.98 | 35.89 |
| Wheat straw | 16.5 | 125 | 1.06 | 78.57 |
| Wheat straw | 16.5 | 175 | 1.00 | 28.38 |
| Wheat straw | 16.5 | 200 | 0.93 | 35.69 |
| Quebracho flour | 8.5 | 175 | 1.22 | 15.41 |
| Quebracho flour | 16.8 | 150 | 1.22 | 13.37 |
| Quebracho flour | 16.8 | 175 | 1.06 | 21.95 |
| Wheat bran | 9.9 | 150 | 1.09 | 27.38 |
| Wheat bran | 18.1 | 150 | 1.18 | 26.01 |

EXAMPLE 3

In this example, mechanical properties of gluten/fibre compositions are determined. The same method as in example 1 is used, except that the panels are formed in a rectangular mould of 120 mm×10 mm. The thickness obtained is between 5 and 6 mm.

The mechanical properties are investigated according to norm EN ISO14125 in bending mode with TAXT2 texture analyser (Stable Microsystems, UK). The distance between flexion points is 100 mm. The samples are analysed directly after fabrication.

Materials Used:
- vital wheat gluten, moisture content 8,6% (Amylum Aquitaine, Bordeaux, France)
- Hemp fibres, moisture content 8,9%, mean size 2 and 6 mm (Agricultural cooperative "La Chanvriere de l'Aube")
- Linen straw (8,9% MC, Unilin NV, B-8710 Wielsbeke)

The results of the mechanical testing are given in table 3.

TABLE 3

Influence of fibre type, moisture content (MC), pressing temperature (T) and gluten fraction (GF) on modulus of elasticity (MOE) and modulus of rupture (MOR). Mean values of 4 replicates.

| Fibre type | MC (% dm) | T (° C.) | GT (w/w) | MOE (GPa) | MOR (MPa) |
|---|---|---|---|---|---|
| Hemp 2 mm | 9.3 | 150 | 0.2 | 3.63 | 31.51 |
| Hemp 2 mm | 18.0 | 150 | 0.2 | 2.54 | 33.34 |
| Hemp 2 mm | 9.3 | 175 | 0.2 | 3.48 | 26.14 |
| Hemp 2 mm | 18.0 | 175 | 0.2 | 3.22 | 31.27 |
| Hemp 6 mm | 18.0 | 150 | 0.3 | 3.22 | 33.91 |
| Hemp 6 mm | 18.0 | 150 | 0.2 | 3.62 | 32.99 |
| Hemp 6 mm | 18.0 | 150 | 0.1 | 2.44 | 29.82 |
| Linen straw | 9.0 | 175 | 0.2 | 4.53 | 43.17 |
| Linen straw | 18.0 | 150 | 0.2 | 2.75 | 25.56 |

EXAMPLE 4

Materials

Vital wheat gluten, (8.6% Moisture content, Amylum Aquitaine, Bordeaux, Fr)

Wood particles (8.5% MC, Unilin NV, Schaapdreef 36, B-8710 Wielsbeke)

Methods

Mixing: The fibres are mixed with wheat gluten in a 5 1 rectangular mixing bowl by hand for 10 min, simulating the movements of a tumbling mixer.

Pressing: A rectangular fibre mat of dimensions 17×26 cm and about 4 cm height is formed by hand using a wooden frame. A k type thermocouple is placed in the centre of the fibre mat. After removal of the wooden frame, the mat is placed into the heated press (regulated at 175° C.) and the temperature recording is started. The mat is compressed to 11 mm final thickness in a hand pump hydraulic press. The time needed for press closure to 11 mm is 60 s, the load is maintained for 120 s, then the load is relaxed gradually to zero during 1 min. The total pressing time is 4 min. 4 flexion specimens (30*170 mm) and 2 specimens (50*50 mm) for thickness swelling and determination of density are cut of each board.

The mechanical properties are investigated in bending mode with a ZWICK 500N universal testing machine. The distance between flexion points is 100 mm, cross-head speed is 2 mm/min. The samples are tested immediately after their fabrication.

Thickness swelling is investigated according to norm EN 319. The test specimens are immersed in distilled water (20° C.), thickness is determined in the centre of the test specimen after 2 and 24 h of immersion.

Results

Core temperature evolution

FIG. 1 shows the core temperature evolution during the fabrication of a gluten wood particleboard. It is observed that temperature rises very rapid as soon as the press is closed and the nominal thickness is reached. Core temperature reaches 150° C in 30 sec after press closure (90 s total press time).

Mechanical Properties

TABLE 4

Mechanical properties and water sensitivity of gluten wood particleboards.

| Sample N° | E | F | G | H | Specifications |
|---|---|---|---|---|---|
| Composition | | | | | EN 312-2 |
| Fibres g | 300 | 300 | 300 | 300 | |
| Gluten g | 60 | 75 | 75 | 33.3 | |
| Thickness mm | 11.4 | 11.5 | 11.2 | 11.7 | |
| Density kg/m³ | | 762.4 | 693.3 | 553 | |
| Mechanical properties | | | | | |
| MOE Gpa | 0.976 | 1.029 | 1.077 | 0.636 | |
| sdev | 0.094 | 0.188 | 0.201 | 0.184 | |
| MOR Mpa | 10.58 | 12.26 | 12.29 | 5.94 | 12.5 |
| sdev | 10.58 | 2.78 | 2.59 | 1.04 | |
| Thickness swelling | | | | | |
| TS (2 h) | | 48.8 | 52.2 | 40.5 | |
| sdev | | 3.9 | 6 | 2.6 | |
| TS (24 h) | | 60.3 | 63.9 | 53.6 | |
| sdev | | 1.7 | 1.9 | 0.1 | |

MOE is modulus of elasticity, MOR is modulus at break, TS is thickness swelling after immersion in 20° C. water.

Specifications are: EN 312-2, general purose particleboard

The production of gluten wood particleboard is feasible. Until now boards with a gluten weight fraction of 0.2 comply with the specifications of general purpose particleboard (EN 312-2).

EXAMPLE 5

In this example mechanical properties of different protein/fibre compositions are determined. The same method as in example 1 is used, except that the panels were formed in a rectangular mould of 120 mm×10 mm. Moulding temperature is 175° C. and moisture content is 9%. The fibre fraction is 0,8. Thickness obtained is between 5 and 6 mm.

Mechanical properties are investigated according to norm EN ISO 14125 in bending mode with TAXT2 texture analyser (Stable Microsystems, UK). The distance between flexion points is 100 mm. The samples are analysed directly after fabrication. The results are displayed in table 5.

Materials Used:
vital wheat gluten, moisture content 8,6% (Amylum Aquitaine, Bordeaux, France)
Linen straw (8,9% MC, Unilin NV, B-8710 Wielsbeke)
Zein (8% MC, Sigma Chemicals)
Corn gluten meal (8,5% MC)
Soy protein isolate (7,8% MC PTI)

TABLE 5

Modulus of elasticity (MOE) and modulus of rupture (MOR) of protein/linen straw composite materials. moulded at 175° C., 9% MC, and 10 min press time:

| Protein binder | MOE (Gpa) | MOR (Mpa) |
|---|---|---|
| Corn gluten meal | 4.9 | 26 |
| Zein | 4.8 | 33 |
| Soy protein isolate | 5.6 | 31 |
| Wheat gluten | 5.0 | 38 |

EXAMPLE 6

This example illustrates the effect of the pressing temperature on the mechanical properties of the fibre boards prepared with wheat gluten as the sole binder.

The boards in this example are prepared by mixing 300 g wood fibres (2% moisture) with 33,3 g wheat gluten (7% moisture) in a T-bar rotating mixer for 3 minutes. Then 25 g water, mixed with 5,5 g parrafin emulsion was added and mixed for an additional 7 minutes.

The pressing procedure as described in example 4 is slightly modified, whereby the pressing temperature was increased to values of 200° C. and 225° C. and pressing time was 10 s/mm. Density of the boards thus prepared varied between 0,732 and 0,735.

The boards thus obtained were submitted to mechanical testing, as already described in example 4.

| Pressing T | Modulus of elasticity (GPa) | Internal bond (MPa) | Thickness swelling in water (%) |
|---|---|---|---|
| 175° C. | 1.12 | 0.31 | 94.8 |
| 200° C. | 1.36 | 0.40 | 100.3 |
| 225° C. | 1.50 | 0.61 | 71.4 |

The invention claimed is:

1. Method for preparing natural fibre-based composite materials containing natural fibres and powdery proteins, comprising the following steps:
   adding a powdery protein adhesive binder to natural fibres having a moisture content of 1-15%;
   mixing the natural fibres together with the powdery protein adhesive;
   adjusting the moisture content of the composition to 6-24% w/w; and
   submitting the mixture to a heat pressure treatment which is performed by means of compression moulding or by hot pressing in open presses to form the natural fibre-based material,
   wherein the proteins added to the natural fibres have a moisture content varying between 4 and 14% w/w.

2. Method according to claim 1, wherein during hot pressing a pressure is exercised that is sufficient to obtain a natural fibre-based composite material with a density varying between 0.5 kg/dm$^3$ and 1.5 kg/dm$^3$.

3. Method according to claim 1, wherein the ratio of natural fibres and protein powder adhesive varies between 19:1 up to 1:1.

4. Method according to claim 1, wherein the heat pressure treatment is performed within a temperature range of 100-250° C.

5. Method according to claim 1, wherein the proteins added to the fibres have a moisture content between 8 and 12% w/w.

6. Method according to claim 1, wherein the natural fibres comprise wood or plant fibres having a moisture content between 1 and 20% w/w.

7. Method according to claim 1, wherein the natural fibres comprise wood or plant fibres having a moisture content between 2 and 15% w/w.

8. Method according to claim 1, wherein the natural fibre-based composite materials include one of the products selected from packaging materials, decorative items, backing materials or structural materials.

9. Method according to claim 1, wherein said natural fibres are obtained from whole plants or various parts thereof.

10. Method for preparing natural fibre-based composite materials containing natural fibres and powdery proteins, comprising the following steps:
    adding a powdery protein adhesive binder to natural fibres having a moisture content of 1-15%;
    mixing the natural fibres together with the powdery protein adhesive;
    adjusting the moisture content of the composition to 6-24% w/w; and
    submitting the mixture to a heat pressure treatment which is performed by means of compression moulding or by hot pressing in open presses to form the natural fibre-based material,
    wherein said natural fibres are of animal origin.

11. Method according to claim 1, wherein said powdery protein adhesive are of animal origin.

12. Method according to claim 1, wherein said powdery protein adhesive are of vegetable origin.

13. Method according to claim 1, wherein the final moisture content of the composition is adjusted to 12-20% w/w.

14. Method according to claim 13, wherein the final moisture content of the composition is adjusted to 14-18% w/w.

15. Method according to claim 1, wherein the ratio of natural fibres and protein powder adhesive vary between 9:1 and 2:1.

16. Method according to claim 15, wherein the ratio of natural fibres and protein powder adhesive vary between 9:1 and 2.5:1.

17. Method according to claim 1, wherein the heat pressure treatment is performcd within a temperature range of 175-225° C.

* * * * *